US006837104B2

(12) United States Patent
Sapir

(10) Patent No.: US 6,837,104 B2
(45) Date of Patent: Jan. 4, 2005

(54) TIRE SAFETY SYSTEM

(76) Inventor: Itzhak Sapir, 27 Foxhill St., Irvine, CA (US) 92604

( * ) Notice: Subject to any disclaimer, the term of this patent is extended or adjusted under 35 U.S.C. 154(b) by 0 days.

(21) Appl. No.: 10/680,880

(22) Filed: Oct. 7, 2003

(65) Prior Publication Data

US 2004/0065398 A1 Apr. 8, 2004

Related U.S. Application Data

(60) Provisional application No. 60/416,771, filed on Oct. 8, 2002, and provisional application No. 60/416,926, filed on Oct. 9, 2002.

(51) Int. Cl.[7] .............................................. B60C 23/00
(52) U.S. Cl. ...................................... 73/146.3; 340/442
(58) Field of Search .............................. 73/146, 146.2, 73/146.3, 146.4, 146.5; 340/425.5, 438, 442, 445; 701/29

(56) References Cited

U.S. PATENT DOCUMENTS

| | | | | |
|---|---|---|---|---|
| 3,095,917 A | * | 7/1963 | Arsandaux | 152/155 |
| 3,392,772 A | * | 7/1968 | Powers | 152/158 |
| 3,724,521 A | * | 4/1973 | Coddington et al. | 152/340.1 |
| 3,850,217 A | * | 11/1974 | Edwards et al. | 152/503 |
| 3,901,301 A | * | 8/1975 | Edwards | 152/521 |
| 4,008,743 A | * | 2/1977 | Welch | 152/158 |
| 4,258,771 A | * | 3/1981 | Snyder | 152/521 |
| 4,877,071 A | * | 10/1989 | Tanigawa et al. | 152/165 |
| 5,325,902 A | * | 7/1994 | Loewe et al. | 152/419 |
| 6,255,940 B1 | * | 7/2001 | Phelan et al. | 340/447 |
| 2004/0140042 A1 | * | 7/2004 | Teratani et al. | 156/110.1 |
| 2004/0154719 A1 | * | 8/2004 | Zuigyou | 152/340.1 |

* cited by examiner

*Primary Examiner*—Eric S. McCall
(74) *Attorney, Agent, or Firm*—Clement Cheng

(57) ABSTRACT

A tire safety system mounts on a vehicle wheel rim inside a pneumatic tire. A tire air pressure sensor produces a tire air pressure reading mounted inside the tire. An inflatable member forms a toroidal expandable internal safety structure. The inflatable member is mounted against the vehicle wheel rim. The chemicals container inside the inflatable member receives an electrical signal at an activation input. The chemicals container creates pressurized gas inside the inflatable member for inflation when a signal is received at the activation input. A circumferential radially expandable protective belt mounted around the inflatable member expands with inflatable member inflation to accommodate operation the tire when expanded. A computer receiving tire air pressure readings from the tire air pressure sensor sends a signal to the activation input upon a sudden change in tire air pressure.

12 Claims, 3 Drawing Sheets

TIRE SAFETY SYSTEM

This application is a continuation of provisional application Nos. 60/416,771 filed Oct. 8, 2002 and 60/416,926 filed Oct. 9, 2002.

BACKGROUND

Rapid tire deflation has been a problem since the dawn of the automobile. Rapid deflation can cause accidents on the road leaving a driver and passengers stranded in inhospitable situations. Various devices have been invented to prevent or mitigate the loss of air pressure in tires.

A tire that can be run after loss of or reduction in pressure has been a desirable objective in the tire industry for some time. A tire that can be run in a deflated condition for an appreciable distance permits the driver to continue after the loss of or reduction in pressure or until a replacement tire can be obtained or the damaged tire repaired. This would eliminate changing tires on the road and the need to depend on the serviceable condition of a spare tire that takes up considerable space in the vehicle. Also, such a safety tire would permit the driver to continue on some distance until a safe stopping place could be found thus avoiding sudden stopping on crowded, streets, bridges and highways. Many pneumatic tire constructions have been designed in an attempt to achieve these capabilities such as the constructions of U.S. Pat. Nos. 3,095,917, 3,392,772 and 3,724,521, however, none have been wholly successful in meeting the operational demands of current automotive vehicles.

U.S. Pat. No. 4,008,743 to Welch shows a pneumatic tire with an internal toroidal safety structure that expands and provides emergency support between the tire tread and the wheel rim if the tire loses inflation pressure. The safety structure has an outer circumferential belt comprising one or more superposed layers of cord reinforced strips, the belt being secured to the safety structure in a relatively narrow central circumferential zone so that radial expansion of the toroidal safety structure is readily accommodated should the tire lose inflation pressure. The belt bears between the inner surface of the tread portion of the tire and the safety structure in the event of tire deflation or underinflation and thus guards against puncture.

The internal safety structure of the Welch inflatable tube or resilient toroidal member with special reinforcing means can be bulky and make tire changes cumbersome. Safety structures introduced inside of the tire are subject to the rotational acceleration and vibration forces due to tire rotation from ordinary use and bumps on the road. Double inner tubes, solid rubber tires and related structures greatly complicate tire balancing, add weight and make tire maintenance more cumbersome. The tire construction of the present invention, however, reduces these difficulties.

OBJECTS OF THE INVENTION

The present invention increases the driving safety of wheeled vehicles in case of loss of tire air pressure, without adding substantial bulk to the tire.

DETAILED DESCRIPTION OF THE PREFERRED EMBODIMENT

The hollow inflatable portion 30 supports a vehicle and gives a tire supplemental structural integrity in case of rapid deflation. The inflatable portion can be formed as a single toroidal member 30 around the wheel 20 or from multiple inflatable members joining together at their periphery to form a shape approximating a toroidal inflatable member. The inflatable members can be formed as a pair of semicircular halves or as three or four members spaced equal distantly around the inside periphery of the wheel. More than members can be used for additional redundancy. Each member forms an equal section of the torus shape and conforms to the shape of the inside of the tire upon inflation.

The tire 10 is separately installed and inflated around the wheel 20. The tire does not need to touch the inflatable members when the inflatable members are in a deflated mode. Because the inflatable members are compactly stowed and folded, they do not take up much space inside the tire.

Figure 5:
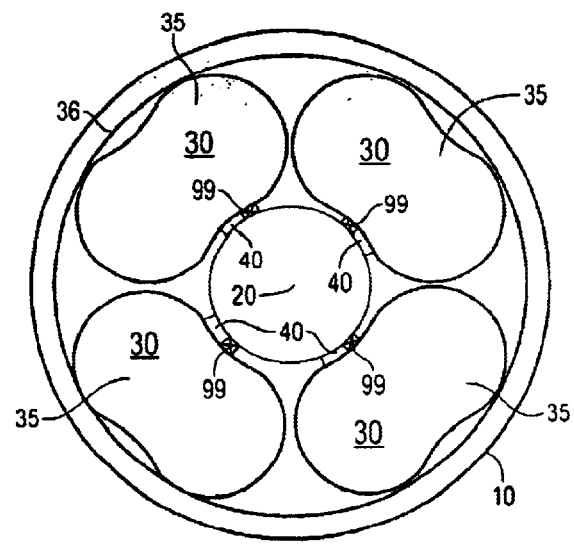
FIG. 5 is a side view of a secondary embodiment of the invention.

In the second preferred embodiment, as shown in FIG. 5, multiple inflatable portions 30 inflate in tandem to form a continuous inflated support for a deflated tire. In the multiple member embodiment, each member has its own independent chemicals container.

Mixing and reacting chemicals sequestered and stored in a chemicals container 40 forms the pressurized gas. Each inflatable portion is inflated by pressurized gas to bolster remaining tire pressure. One or more chemicals containers 40 can be activated by an electronic signal to produce pressurized gas 35. The chemicals container 40 inflation system can react chemicals such as sodium azide (NaN3) with potassium nitrate (KNO3) to produce nitrogen gas. Hot blasts of the nitrogen inflate the inflatable portion. Chemicals containers are widely known in the art and available commercially for mixing and reacting chemicals rapidly to form hot blasts of gas from solid chemicals.

The inflatable portion of the system is a folded hollow torus reinforced at the external circumference by a thick rubber belt that can be formed as a continuous belt or in sections, pieced together. This torus is mounted inside the wheel prior to mounting the tire. The internal diameter of inflatable portion matches the wheel size so that it does not rotate easily relative to the wheel. Attachment means such as double-sided adhesive tapes may supplement the interference fit.

On the inside of the belt facing the wheel, a number of chemicals' containers are symmetrically distributed to minimize dynamic imbalance. For a single inflatable member, the chemicals container may be formed around the wheel as a single unit inside belt 44 mounted inside the inflatable member 30.

The protective belt 36 is mounted outside and around the inflatable members. Sometimes there may be a sharp object sticking through the inside of the tire causing the puncture. A protective belt 36 of thicker rubber or heavy cloth may be included to protect the inflatable member 30. The protective belt 36 also stabilizes the inflatable members and connects the inflatable members to each other.

The device also includes a tire air pressure sensor 50. When the air pressure drops below a certain predetermined pressure level the system when armed triggers the chemicals to produce pressurized gas and inflate the inflatable member. The arming mode can be switch activated. In the best mode, a rotation sensor switches the system to armed mode only above a certain wheel rotation speed. A wide variety of commercially available rotation sensors can be implemented and mounted inside or outside the device.

The system includes three alarm modes with a speaker mounted in each device. The first is a general no motion low pressure audible sound indicating the need to inflate a tire. The second is an in motion low pressure audible sound that tries to prevent a blowout caused by having a too low pressure in one of the tires. The third is a system activated audible sound indicating a malfunction with the system. The computer may have a malfunction range of input values when the rotation or pressure data are outside of the range of the normal operating conditions. A transmitter 80 can replace the audible alarm so that warning signals are transmitted to a receiver in the driver's cabin 90.

The proposed system may also include a means for adjusting the parameters (pressures, rotation speeds etc.) to the recommended values for the type of vehicle and wheel on which the system is mounted. A computer 95 can be programmed and set for each type of vehicle and wheel. The proposed system may also include a means for analyzing the rate of change in air pressure and in cases where the rate of change is above a certain value, activate the system even when still above the pressure threshold such as in case of a blowout. Again, a computer 95 can be programmed to activate the chemicals container after analyzing the pressure data. A power switch 55 can be connected to the computer to shut off the computer and to deactivate the system for maintenance or repair.

Figure 1:
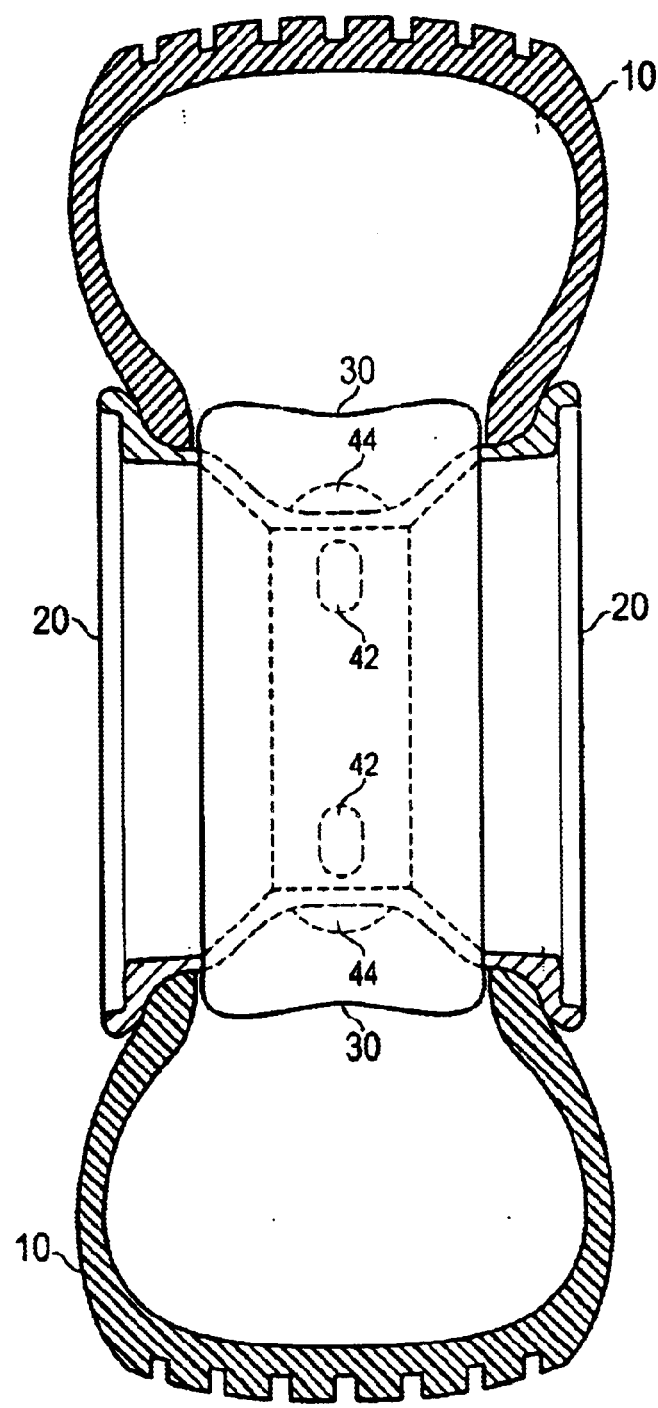
FIG. 1 is a front sectional view of the device showing inflatable portion stowed position.
Figure 2:
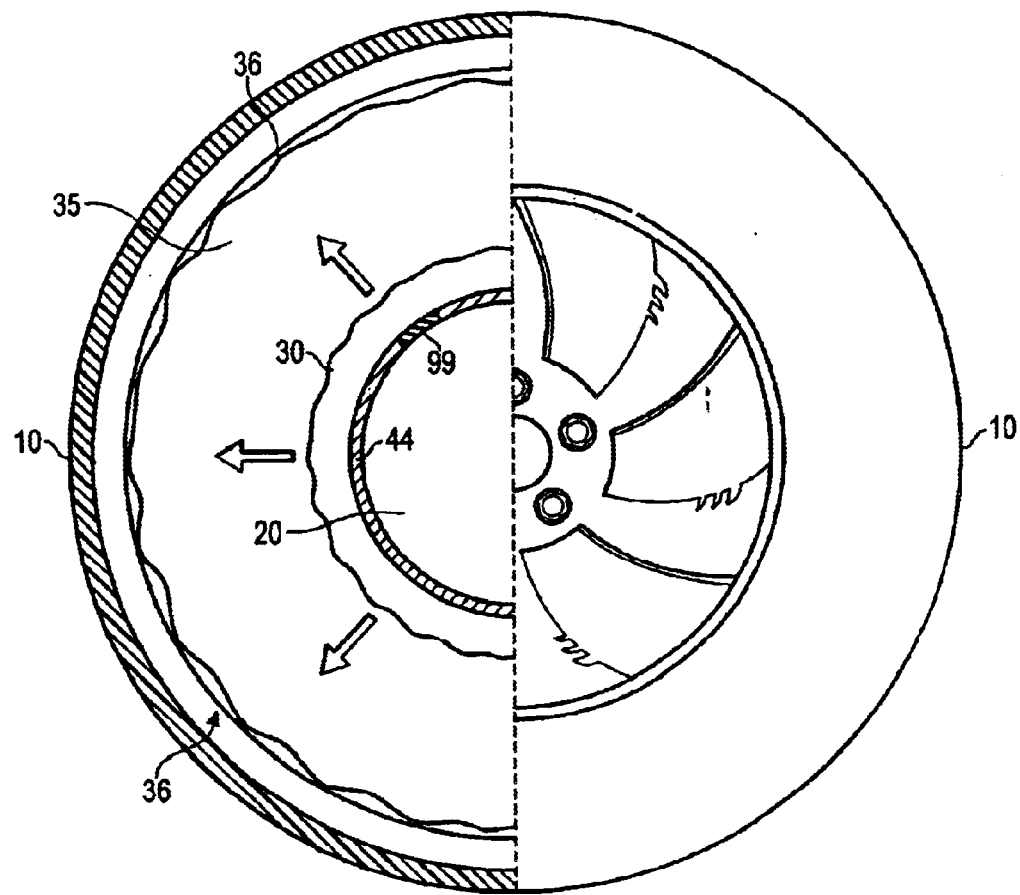
FIG. 2 is a side sectional view of the device showing inflating inflatable portion.
Figure 3:
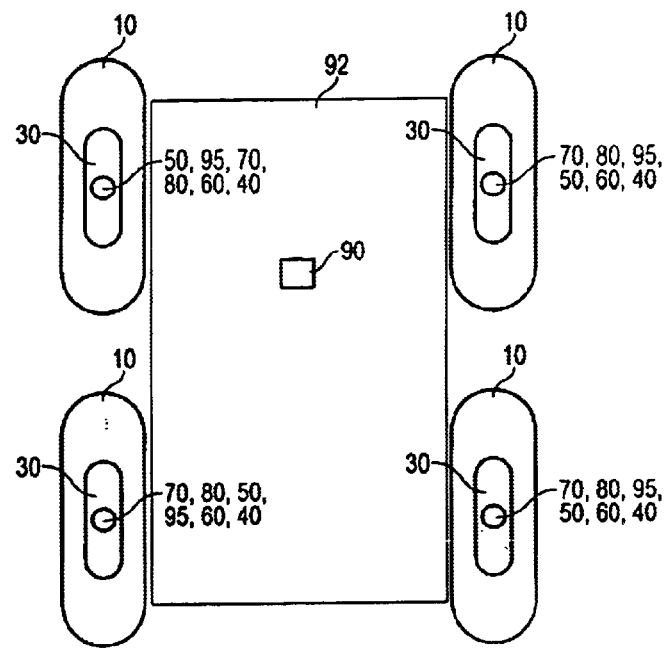
FIG. 3 is a schematic diagram of the invention.
Figure 4:
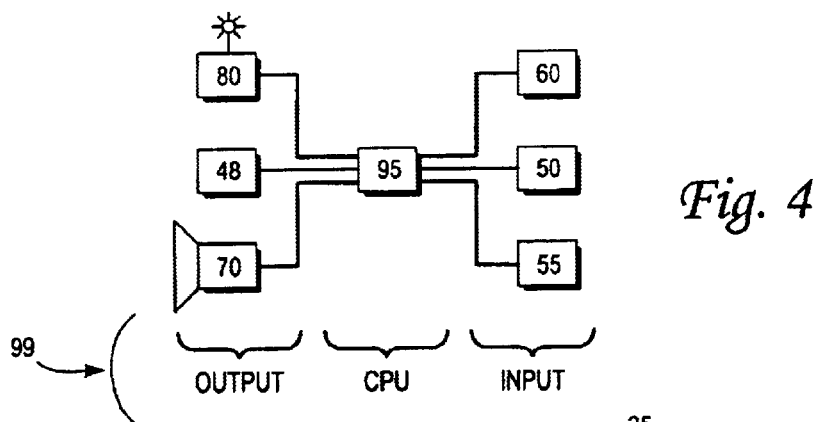
FIG. 4 is a schematic diagram of the control unit.

Certain elements of the device can be consolidated and packaged into a control unit 99 as shown in FIG. 4. The inputs consisting of the power switch 55, the rotation sensor 60, and to the tire pressure sensor 50 can be separately input into a computer 95. The computer 95 produces an electrical signal controlling the speaker 70, the transmitter 80, and the chemicals container activation input 48. The chemicals container activation input receives an electrical signal triggering the mixing and reaction of the chemicals causing the subsequent deployment of the hot gas inside the inflatable member 30. Each of the components such as the rotation sensor, control unit, speaker, transmitter may have its own electrical power supply. The use of power supply is obvious in this case. Transmitters mounted within the safety system can send output data of sensors to a computer in the cabin so that the computer may receive data from all four of the tires for comparison and analysis.

The computer can be programmed with a table of acceptable rotation and air pressure. The rotation and air pressure data is correlated with a chart for the computer to determine which course of action to take. The computer may output an audible sound, or activate the chemicals container by sending a signal to the activation input.

CALL OUT LIST OF ELEMENTS

10 Tire
20 Wheel
30 Inflatable Member
35 Hot Gas Expanding Inflatable Member
36 Protective Belt
40 Chemicals Containers
44 Chemicals Container In The Shape Of An Inside Belt
48 Chemicals Containers Activation Input
50 Tire Air Pressure Sensor
55 Power Switch
60 Rotation Sensor
70 Speaker
80 Transmitter
90 Receiver
92 Cabin
95 Computer
99 Control Unit

What is claimed is:

1. A tire safety system adapted for mounting on a vehicle wheel rim inside a pneumatic tire comprising: a tire air pressure sensor producing a tire air pressure reading mounted inside the tire; an inflatable member forming a toroidal expandable internal safety structure, wherein the inflatable member is mounted against the vehicle wheel rim; a chemicals container inside the inflatable member, capable of receiving an electrical signal at an activation input, wherein the chemicals container contains chemicals capable of mixing and reacting to form pressurized gas inside the inflatable member for inflation when a signal is received at the activation input; a circumferential radially expandable protective belt mounted around the inflatable member that expands with inflatable member inflation to accommodate operation the tire when expanded; a computer receiving tire air pressure readings from the tire air pressure sensor sends a signal to the activation input upon a sudden change in tire air pressure.

2. The tire safety system of claim 1 wherein, the chemicals container is in the shape of an inside belt forming a thin torus mounted inside the inflatable member.

3. The tire safety system of claim 1 wherein, the inflatable member is folded in collapsed position against the vehicle wheel rim.

4. The tire safety system of claim 1 further comprising, a speaker mounted within the tire safety system receiving an output from the computer, wherein the speaker makes an audible sound to denote that the tire pressure is low.

5. The tire safety system of claim 1 further comprising, a speaker mounted within the tire safety system receiving an output from the computer, wherein the speaker makes an audible sound to denote a malfunction.

6. The tire safety system of claim 1 further comprising, a rotation sensor mounted within the tire safety system sending an output to a computer wherein the computer disarms the chemicals container at a user preset low RPM.

7. The tire safety system of claim 1 further comprising, a transmitter mounted within the tire safety system sending an output to a computer in the cabin.

8. A tire safety system adapted for mounting on a vehicle wheel rim inside a pneumatic tire comprising: a tire air pressure sensor producing a tire air pressure reading mounted inside the tire; a plurality of inflatable members forming a toroidal expandable internal safety structure, wherein the plurality of inflatable members are mounted against the vehicle wheel rim; a chemicals container inside each inflatable member, each capable of receiving an electrical signal at an activation input, wherein each chemicals container contains chemicals capable of mixing and reacting to form pressurized gas inside each inflatable member when a signal is received at the activation input; a circumferential radially expandable protective belt mounted around the plurality of inflatable members that expands with inflatable member inflation to accommodate operation the tire when expanded; a computer receiving tire air pressure readings from the tire air pressure sensor sends a signal to the activation input upon a sudden change in tire air pressure.

9. The tire safety system of claim 8 further comprising, a speaker mounted within the tire safety system receiving an output from the computer, wherein the speaker makes an audible sound to denote that the tire pressure is low.

10. The tire safety system of claim 8 further comprising, a speaker mounted within the tire safety system receiving an output from the computer, wherein the speaker makes an audible sound to denote a malfunction.

11. The tire safety system of claim 8 further comprising, a rotation sensor mounted within the tire safety system sending an output to a computer wherein the computer disarms the chemicals container at a user preset low RPM.

12. The tire safety system of claim 8 further comprising, a transmitter mounted within the tire safety system sending an output to a computer in the cabin.

* * * * *